UNITED STATES PATENT OFFICE 2,213,423

HYDROCARBON COPOLYMER COMPOSITION

Peter J. Wiezevich, Elizabeth, N. J., now by judicial change of name Peter J. Gaylor, assignor to Standard Oil Development Company, a corporation of Delaware No Drawing. Application April 9, 1937, Serial No. 135,884

8 Claims. (Cl. 260—4)

This invention deals with the preparation of new hydrocarbon copolymers of high molecular weight having exceptional and useful properties. More particularly, it relates to the copolymerization of aliphatic olefines with other polymerizable materials to yield products differing in many respects from the products obtained by polymerizing the individual constituents alone.

Aliphatic olefines have been polymerized to high molecular weight products. For example, isobutylene subjected to temperatures below 0° C. when treated with a halide catalyst such as boron fluoride, yielded high molecular weight substantially saturated linear polymers ranging from thick viscous liquids to rubbery solids.

It is also known that other unsaturated compounds, such as styrene, vinyl acetate, acetylene, chlorprene, acetaldehyde, vinyl chloride, vinyl acetylene, butadiene, divinyl benzene, and the like polymerize to form linear polymers, but in the case of such materials, the polymerization is usually carried out at elevated temperatures, say 100–250° F., and preferably in presence of catalysts such as benzoyl peroxide, sodium, and the like. Such polymers are generally insoluble or very sparingly soluble in mineral lubricants when prepared in high molecular weight form. Due to the difference in reactivity and methods of polymerization of the two classes of materials just described, it would appear that high molecular weight copolymers of aliphatic olefines with other polymerizable compounds could not be prepared.

Low molecular weight copolymers of aliphatic olefines have been prepared, but these products are of no interest for the present invention since they are generally light oils of high volatility unsuitable as thickening agents for mineral lubricating oils, or as plastic building materials, etc.

An object of this invention is to prepare high molecular weight aliphatic hydrocarbon copolymers, i. e. products having molecular weights above 300 or 1500 and ranging up to 5,000, 40,000, 100,000 or even 200,000. Another object is to prepare lubricating oils of high viscosity index from such copolymers. Still another object is to prepare plastic and molded products of exceptional properties from the copolymers. Other objects will become apparent as the description proceeds.

The reaction mixture in the present invention contains at least two polymerizable organic compounds. The first must be an aliphatic olefine having more than two carbon atoms. Although compounds such as propylene, triisobutylene, methyl 2 butene 1, cracked wax, and the like may be employed, it is most suitable to employ an iso-olefine, and preferably substantially pure isobutylene for this purpose.

The other ingredient of the reaction mixture is a reactive organic compound capable of polymerizing in itself, and preferably one which produces a linear polymer. The term polymerization employed herein is limited only to reactions wherein the polymer is substantially the only product. Hence, materials such as hydroxy acids which liberate water when polymerized to a polymer are specifically excluded. It is also preferable in this case that the second ingredient be capable of polymerizing to a linear type product which is composed of multiples of the monomeric radical, as exemplified by the reaction:

$$nR \rightarrow (\ldots R\text{—}R\text{—}R\text{—}R\text{—}R \ldots)n$$

Styrene ($C_6H_5.CH:CH_2$) has been found most suitable for this type of ingredient, although other compounds which are satisfactory are vinyl compounds such as vinyl halides, esters, ethers, etc., acrylic compounds, e. g. methyl acrylate, ethyl methacrylate, acrolein, acrylic acid, etc., diolefines such as butadiene, isoprene and the like, acetylene compounds such as vinyl acetylene, divinyl acetylene, chlorprene, diacetylene, etc., alkylene oxides, e. g. ethylene oxide, propylene oxide, etc., aldehydes such as formaldehyde, acetaldehyde, etc., divinyl benzene, allene, allylene, eugenol, saffrole, vinyl chloride, vinyl acetate, or mixtures of any of the aforesaid materials.

It is desirable that the second constituent of the reaction mixture be soluble in the first constituent, although solvents capable of dissolving both ingredients may be employed in the case of mutually insoluble compounds. Such solvents may be normally gaseous liquefiable saturated hydrocarbons such as propane, butane, ethane, etc., or ethylene, organic halides, e. g. carbon tetrachloride, trichlorethane, methyl chloride, ethyl chloride, difluoro dichloro ethane, and the like.

Although, in some cases, it is possible to effect copolymerization of these ingredients (as when normal aliphatic olefines are employed), it is preferred to affect the copalymerization by use of small quantities of a halide catalyst such as $BF_3$, $AlCl_3$, and the like. Boron fluoride is preferable. Other substances such as water, sulfuric acid, phosphoric acid, hydrochloric acid, etc. may also be present.

The reaction may be carried out at below 0° C., or at the boiling point of the lowest boiling ingredient, or at −20 to −80° C. Heating up to 100° F. is effective when normal aliphatic olefines are employed, while in the case of iso-olefines or even normal olefines of less than 5 carbon atoms, temperatures below 0° C. are preferable. The catalyst is merely added to the reaction mixture, or bubbled through it if it is gaseous (as in the case of $BF_3$).

The copolymers obtained according to this invention are exceptionally useful for the reason that they possess the desirable properties of the polymers of the individual ingredients without the usual concomitant undesirable properties thereof. For example, polystyrol of high molecular weight possesses especially good dielectric properties, but is insoluble in mineral oils thereby being unsuitable for most electrical uses. However, a copolymer of styrene with isobutylene is soluble in mineral oils and is likewise a good dielectric material. On the other hand polyisobutylene is highly suitable for many uses because of its high stability against oxidation and low change in plasticity when subjected to heat. Yet it possesses the undesirable property of being non-thermoplastic. The copolymer, however, is thermoplastic as well as highly stable towards oxidation and possesses low change in plasticity on heating.

The difference between a mechanical mixture and a copolymer can be readily understood from the following experiments.

Polyisobutylene of about 50,000 average molecular weight prepared by polymerization of isobutylene at about —80° C. with boron fluoride was mixed at 50–100° C. with polystyrol prepared by heating styrene at 100° C. Upon cooling, a milky partially thermoplastic (due to free polystyrol) mixture resulted which appeared to be a mixture of particles of polyisobutylene and polystyrol.

In another experiment, isobutylene was mixed with styrene and polymerized with boron fluoride. A clear colorless thermoplastic product was obtained which indicated no separation and which consisted of a copolymer of isobutylene and polystyrene.

The following example gives additional data in this respect:

A copolymer of styrene and 2-pentene was made at —45° F. using a catalyst prepared by saturating water with $BF_3$. After washing the polymer several times with alcohol, it was precipitated from petroleum ether with methanol three times and the residual solvent removed by heating in a vacuum oven for four hours. The final product was a viscous liquid at the drying temperature (125° C.) and became a clear, yellow, tough and somewhat brittle mass on cooling to room temperature. Carbon hydrogen analysis showed the following:

|  | Percent C | Percent H |
|---|---|---|
| Styrene | 92.3 | 7.7 |
| Co-polymer | 90.88 | 9.03 |
| Polypentene | 85.7 | 14.3 |

Pentene is accordingly present in the copolymer to the extent of about 19% since two individual polymers could not be separated by fractional precipitation.

Some of the products obtained by copolymerization with substantially pure styrene in this manner are given below:

| Second ingredient | Method of polymerization | Analysis | | Percent reacted in copolymer | |
|---|---|---|---|---|---|
| | | Percent H | Percent C | Styrene | Olefine |
| Isobutylene | $BF_3$ | 12.11 | 87.67 | 33 | 67 |
| Pentene [1] | $BF_3$ | 9.8 | 89.01 | 68 | 32 |
| Triisobutylene | Heat | 8.23 | 91.36 | 92 | 8 |
| Propylene | $BF_3$ | 8.43 | 91.1 | 91 | 9 |
| Dechlorinated wax [2] | Heat | 7.88 | 91.56 | 97 | 3 |
| Polystyrol | | 7.7 | 92.3 | 100 | |
| Poly-olefine | | 14.3 | 85.7 | | 100 |

[1] Obtained by dehydration of secondary amyl alcohol.
[2] Obtained by heating wax containing 17% chlorine to 650° F.

As can be seen from the above analyses, styrene copolymers containing 1 to 3 to 67% or more of aliphatic olefine can be readily prepared, having from about 7.88 to about 12.11% hydrogen. The corresponding analyses of pure polystyrol polymer and pure poly-olefine are given for comparison.

In order to further prove that the product is really a copolymer and not a mechanical mixture of polymers of the two ingredients, a polymer obtained by polymerizing one part styrene with two parts isobutylene with boron fluoride at the boiling point of the aliphatic olefine was fractionally precipitated by means of solvents. The copolymer, containing by analysis, about ⅓ styrene was precipitated from petroleum ether twice with alcohol, then from ethyl ether with alcohol, and finally from petroleum ether with acetone. In each case a small fraction remained in solution. As shown by the table below, the close checks in the analyses indicate that the product is essentially a homogeneous chemical compound (copolymer):

| | Poly-isobutylene | Poly-styrol | Copolymer | Copolymer after fractional precipitation |
|---|---|---|---|---|
| Percent C | 14.3 | 7.7 | 12.11 | 12.2 |
| Percent H | 85.7 | 92.3 | 87.67 | 87.6 |
| Solubility in ether | Almost insoluble | | Soluble | Soluble |

The copolymers prepared according to this invention are soluble in mineral lubricating oils and have the desirable characteristic of raising the viscosity and viscosity index thereof. This is illustrated by the following data:

| Oil | Saybolt viscosity at— | | V. I. |
|---|---|---|---|
| | 210° F. | 100° F. | |
| Coastal oil | 43.5 | 210 | 0 |
| Ditto+5% copolymer | 58.0 | 437 | 85 |

These copolymers possess high dielectric properties making them highly suitable in insulating oils, cable oils, insulating compound as coatings for cables and other conductors, etc. by themselves or in conjunction with other polymers and resins discussed below. They may be admixed in concentrations of 10%, 50%, 80% or more with rubber, synthetic rubbers (e. g. polyolefine sulfides, polychlorprene, polymers of aromatic hydrocarbons with aliphatic dihalides, haloformed rubber such as rubber reformed by reagents such as chlorstannic acid, stannic chloride, boron fluoride, hydrogen chloride, etc., hydro rubber, cyclo rubber, hydro cyclo-rubber, halogenated rubber, butadiene rubber, ebonite, and the like with or without vulcanizing agents), waxes, vinyl polymers, cellulose esters and ethers, metal soaps, resins such as rosin, phenolformaldehyde, sulfur chloride-phenol, urea-formaldehyde, polystyrol, polyisobutylene, halogenated polyisobutylene, and other similar compounds.

The copolymer may likewise be hardened by treating with sulfur chloride or halogenated by chlorine (in solvent solution). It may be used in the above forms in coating and impregnating compositions, plastics, adhesives in laminated glass and foils, paper, cloth, caulking and cleaning compositions, and the like. When added to rubber tires it increases the wearing qualities thereof, especially when employed in amounts of 5–15%. Admixed with wax, resins, asphalt, rubber and similar materials, it is capable of giving self-supporting films of high tenacity. It can also be employed as a thickener for motor fuels and greases in proportions of 0.01 to 5% or more.

When added to lubricants, these copolymers may be used in conjunction with oiliness agents, extreme pressure lubricating agents, oxidation inhibitors, dyes, pour inhibitors, corrosion inhibitors, thickeners, resins, sludge dispensers, colloidal materials such as graphite, zinc oxide, etc., lead, aluminum, and other metal soaps, and the like.

This application is a continuation-in-part of my copending application U. S. Serial No. 54,244 filed on December 13, 1935.

This invention is not limited to any specific examples or any theory of reaction but only by the accompanying claims in which it is intended to cover the invention as broadly as the prior art permits.

I claim:

1. Composition comprising rubber and about 5 to 80% by weight of a copolymer of isobutylene and styrene, having a molecular weight above 800.

2. A composition comprising a rubber and a copolymer of an aliphatic olefine and styrene, said copolymer containing about 88–91% carbon and about 12–9% hydrogen and being soluble in petroleum ether.

3. A composition comprising a rubber and a copolymer of an aliphatic mono-olefine having more than two carbon atoms and of a linearly polymerizable vinyl compound non-homologous to said aliphatic mono-olefine, said copolymer having a molecular weight above 800 and containing radicals provided by said aliphatic mono-olefine in a proportion ranging from 3 to about 67% combined with radicals provided by said vinyl compound.

4. A composition according to claim 3 in which said aliphatic mono-olefin is isobutylene.

5. A composition according to claim 3 in which said vinyl compound is styrene.

6. A composition according to claim 3 comprising also a vulcanizing agent.

7. A composition according to claim 3 in which said copolymer is contained in a proportion amounting from about 5 to 80% by weight.

8. A composition comprising a rubber and about 5 to 80% of a copolymer of an iso-olefine and of a linearly polymerizable vinyl compound selected from the group consisting of styrene, vinyl halides, vinyl esters, vinyl ethers, acrylic compounds, di-olefines, vinuyl acetylenes, and alkylene oxides, said copolymer having a molecular weight of at least 800 and containing a sufficient amount of radicals provided by the vinyl compounds to substantially modify the properties inherent in the polymeric radicals of the iso-olefine combined therewith.

PETER J. WIEZEVICH.

DISCLAIMER 2,213,423.—*Peter J. Wiezevich*, Elizabeth, N. J., now by judicial change of name Peter J. Gaylor. HYDROCARBON COPOLYMER COMPOSITION. Patent dated Sept. 3, 1940. Disclaimer filed Jan. 29, 1946, by the assignee, *Jasco, Incorporated*.

Hereby enters this disclaimer to that part of claim 8 in the specification which is in the following words: "acrylic compounds,".

[*Official Gazette February 26, 1946.*]